(12) United States Patent
Cowan et al.

(10) Patent No.: US 11,505,059 B2
(45) Date of Patent: Nov. 22, 2022

(54) ACTUATION MECHANISM FOR ACTIVE GRILLE SHUTTERS

(71) Applicant: MAGNA EXTERIORS INC., Concord (CA)

(72) Inventors: Michael James Cowan, Macomb, MI (US); Martin Robert Matthews, Troy, MI (US)

(73) Assignee: MAGNA EXTERIORS, INC., Concord (CA)

( * ) Notice: Subject to any disclaimer, the term of this patent is extended or adjusted under 35 U.S.C. 154(b) by 23 days.

(21) Appl. No.: 17/207,901

(22) Filed: Mar. 22, 2021

(65) Prior Publication Data
US 2021/0309100 A1    Oct. 7, 2021

Related U.S. Application Data

(60) Provisional application No. 63/004,655, filed on Apr. 3, 2020.

(51) Int. Cl.
*B60K 11/08* (2006.01)

(52) U.S. Cl.
CPC .................. *B60K 11/085* (2013.01)

(58) Field of Classification Search
CPC .. B60K 11/085; B60Y 2400/404; Y02T 10/88
See application file for complete search history.

(56) References Cited

U.S. PATENT DOCUMENTS

| | | | | |
|---|---|---|---|---|
| 5,969,431 | A * | 10/1999 | Miller | B60S 1/26 307/10.1 |
| 7,201,619 | B1 * | 4/2007 | Viggiano | B63C 9/0005 440/1 |
| 7,533,591 | B2 * | 5/2009 | Wang | F16H 25/20 5/616 |
| 2010/0236343 | A1 * | 9/2010 | Chiang | F16H 25/20 74/89.34 |
| 2012/0305818 | A1 * | 12/2012 | Charnesky | B60K 11/085 251/212 |
| 2013/0092462 | A1 * | 4/2013 | Chinta | B60K 11/085 180/68.1 |
| 2017/0225560 | A1 * | 8/2017 | Klop | F01P 7/10 |
| 2018/0341082 | A1 * | 11/2018 | Minor | F41G 1/38 |
| 2019/0091445 | A1 * | 3/2019 | House | A61M 25/0136 |
| 2020/0377158 | A1 * | 12/2020 | Cunningham | B62D 37/02 |

* cited by examiner

*Primary Examiner* — Kurt Philip Liethen
(74) *Attorney, Agent, or Firm* — Warn Partners, P.C.

(57) ABSTRACT

An active grille system having a linear actuation mechanism. The active grille system has vanes connected to a link arm. The vanes rotate between an open position and a closed position using force transmitted by the link arm. Connected to the frame is an actuator that has a mover that provides force to a linear actuation mechanism that is connected to the link arm.

10 Claims, 2 Drawing Sheets

US 11,505,059 B2

ACTUATION MECHANISM FOR ACTIVE GRILLE SHUTTERS

FIELD OF THE INVENTION

The present invention relates to a linear actuation mechanism for an active grille shutter system.

BACKGROUND OF THE INVENTION

In the automotive field there has been an increased usage of active components that are used to reduce wind resistance and provide better fuel economy. One particular application involves active grille shutter (AGS) systems used to control air flow used to heat or cool components. AGS systems of this type are typically found in the fresh air intake path on the vehicle and are used on cars having both internal combustion engines as well as electric vehicles.

SUMMARY OF INVENTION

The present invention is directed to an active grille system having a linear actuation mechanism. The active grille system has vanes connected to a link arm. The vanes rotate between an open position and a closed position using force transmitted by the link arm. Connected to the frame is an actuator that has a mover that provides force to a linear actuation mechanism that is connected to the link arm.

The linear actuation mechanism has several components with a main portion being a barrel with a cavity having an axis. The barrel includes a first end aperture and a second end aperture. The linear actuation mechanism also includes a plunger having a plunger tip at one end and a cam connection at a second end. The plunger is slidably position through the first end aperture of the barrel so that the plunger tip moves between a retracted position and an extended position. There is a retraction spring circumscribing a portion of the shaft of the plunger positioned between a wall adjacent the first end aperture of the barrel, and a spring bushing on an outside surface of the plunger. The retraction spring biases the plunger tip toward the retracted position.

The linear actuation mechanism further includes a pusher positioned in the cavity having a tip extending outside of the second end aperture. The tip is engageable with the actuator. During operation of the active grille system the pusher moves between a plunger extended position, a free motion position and a plunger retract position.

The linear actuation mechanism also includes a rotating cam position between the second end of the plunger and the pusher. The rotating cam has a plunger face surface in contact with the second end of the plunger and a second cam surface in contact with the first cam surface on the pusher. The rotating cam rotates about the axis in response to the first cam surface of the pusher acting on the second cam surface of the rotating cam.

The cavity of the barrel has one or more stops positioned radially within the cavity. During operation, the rotating cam rotates between a stop position wherein the second cam surface engages the one or more stops and holds the plunger in the extended position and a retracted position where the rotating cam slides past the one or more stops allowing the plunger to move the retracted position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 2:
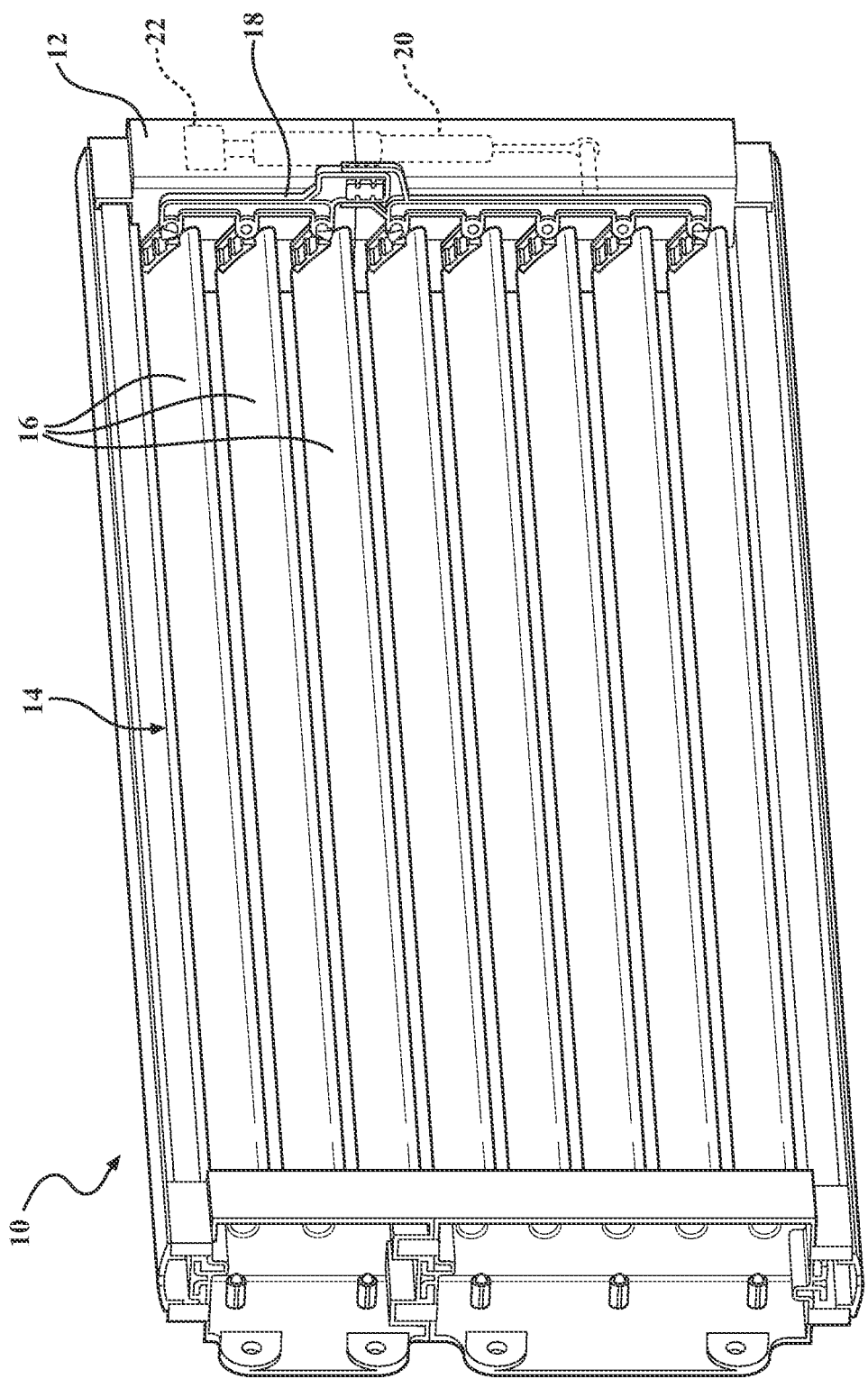
FIG. 2 is a rear side perspective view of an active grille shutter system.

The present invention is directed to an active grille system (AGS 10 (shown in FIG. 2) that is used for controlling the air flow into an engine of a motor vehicle or other power source by providing a frame 12 defining an aperture 14. One or more vanes 16 extend across the aperture 14 and rotate between an open position and a closed position to control the air flow through the aperture 14 using force transmitted by a link arm 18 that connects with all of the vanes 16. A linear actuation mechanism 20 is connected to or formed with the link arm 18. An actuator 22 is connected to the linear actuation mechanism 20 to cause the linear actuation mechanism 20 to move between an extended position and a retracted position. The actuator 22 can be any actuator suitable to actuate the components of the actuator 22 by pressing on a plunger 24 of the linear actuation mechanism 20.

Figure 1:
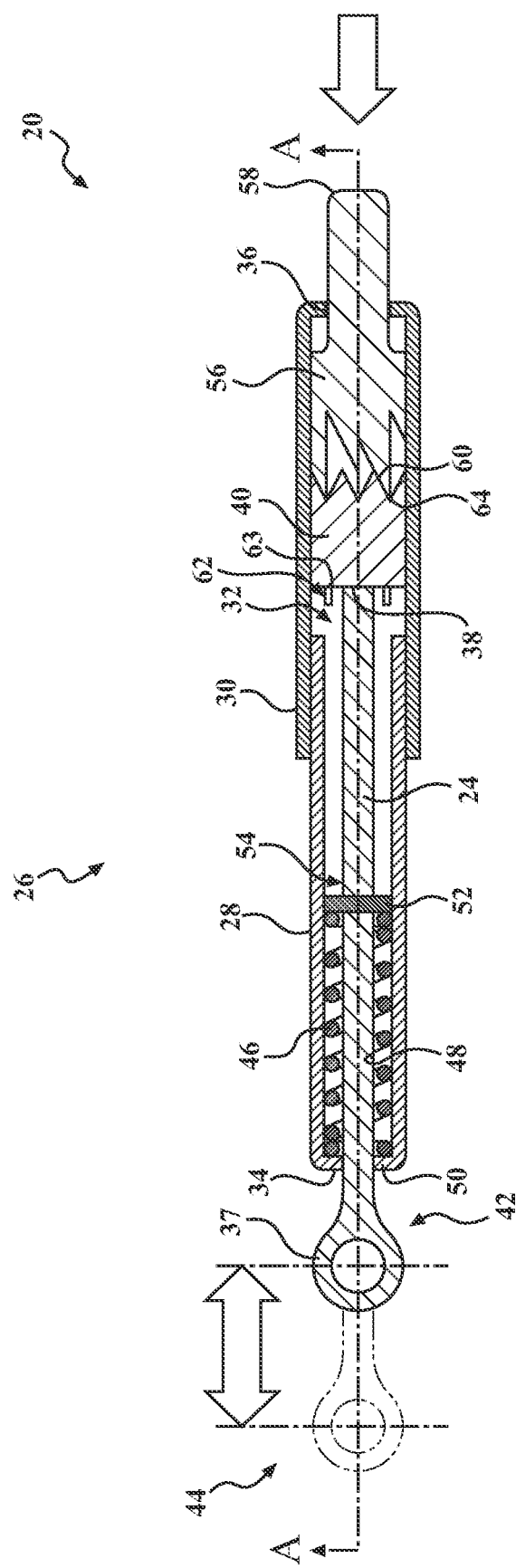
FIG. 1 is a cross sectional side plan view of a linear actuation mechanism for use with an active grill shutter system according to one embodiment of the present invention.

The linear actuation mechanism 20 includes a barrel 26 with a body 28 and cap 30 that connect together and form a cavity 32 having an axis A-A. The barrel 26 has a first end aperture 34 and a second end aperture 36. The plunger 24 includes a plunger tip 37 at one end that is shown as having a loop that connect to the link arm 18. While a connection to the link arm 18 is described it is within the scope of the invention for the linear actuation mechanism 20 to the part of the link arm 18, which in such an embodiment the loop would be connected to one of the vanes 16. The plunger 24 further includes a cam connection 38 at a second end, which is shown as a flat surface that contacts a rotating cam 40 which will be described in greater detail below. The plunger 24 is slidably position through the first end aperture 34 of the barrel 26 so that the plunger tip 37 moves between a retracted position 42 and an extended position 44 as shown in FIG. 1.

A retraction spring 46 circumscribes a portion of a shaft 48 of the plunger 24 positioned between a wall 50 adjacent the first end aperture 34 of the barrel 26 and a spring bushing 52 on an outside surface 54 of the plunger 24. The retraction spring 46 biases the plunger tip 37 toward the retracted position 42.

The linear actuation mechanism 20 further includes a pusher 56 positioned in the cavity 32 and having a tip 58 extending outside of the second end aperture 36, the tip 58 being engageable with the actuator 22. The pusher 56 moves between a plunger extended position, a free motion position and a plunger retract position. The pusher 56 has a first cam surface 60 facing toward the plunger 24. There is also one or more stops 62 positioned radially within the cavity 32. The stops 62 can be located on the pusher 56 or on the cap 30.

There is further provided the rotating cam 40 position between the second end 38 of the plunger 24 and the pusher 56. The rotating cam 40 has a plunger face surface 63 in contact with the second end 38 of the plunger 24 and a second cam surface 64 in contact with the first cam surface 60 on the pusher 56. The rotating cam 40 rotates about the axis A-A in response to the first cam surface 60 of the pusher 56 acting on the second cam surface 64 of the rotating cam 40. The rotating cam 40 rotates between a stop position wherein the second cam surface 64 engages the one or more stops 62 and holds the rotating cam 40 and the plunger 24 in the extended position 44. The rotating cam 40 also rotates so the rotating cam 40 slides past the one or more stops 62 and allows the plunger 24 to move the retracted position 42.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active grille system having a linear actuation mechanism comprising:
   an active grille system having at least one moveable vane connected to a frame, wherein the at least one moveable vane rotates between an open position and a closed position using force transmitted by a linear actuation mechanism;
   wherein the linear actuation mechanism includes:
      a barrel with a cavity that includes a first end aperture and a second end aperture;
      a plunger having a plunger tip at one end, wherein the plunger is slidably positioned through the first end aperture of the barrel so that the plunger tip moves between a retracted position and an extended position;
      a pusher positioned in the cavity and having a tip extending outside of the second end aperture, wherein the pusher exerts force on the plunger and moves the plunger between a plunger extended position, a free motion position and a plunger retract position;
      wherein the pusher has a first cam surface facing toward the plunger;
      one or more stops positioned radially within the cavity; and
      a rotating cam position between the second end of the plunger and the pusher, wherein the rotating cam has a plunger face surface in contact with the second end of the plunger and a second cam surface in contact with the first cam surface on the pusher, the rotating cam rotates about an axis of the barrel in response to the first cam surface of the pusher acting on the second cam surface of the rotating cam, such that the rotating cam rotates between a stop position wherein the second cam surface engages the one or more stops and holds the plunger in the extended position and a retracted position where the rotating cam slides past the one or more stops allowing the plunger to move the retracted position, and
   an actuator having a mover engageable with the tip of the pusher for providing force to the linear actuation mechanism thereby causing the at least one moveable vane to rotate between an open position and a closed position.

2. The active grille system having a linear actuation mechanism of claim 1, wherein the linear actuation mechanism further comprises:
   a shaft of the plunger; and
   a retraction spring circumscribing a portion of the shaft of the plunger positioned between a wall adjacent the first end aperture of the barrel and a spring bushing formed on the plunger, wherein the retraction spring biases the plunger tip toward the retracted position.

3. The active grille system having a linear actuation mechanism of claim 1, wherein the actuator is a solenoid actuator.

4. An active grille system having a linear actuation mechanism comprising:
   an active grille system having at least one moveable vane connected to a frame, wherein the at least one moveable vane rotates between an open position and a closed position using force transmitted by a linear actuation mechanism;
   wherein the linear actuation mechanism includes:
      a barrel with a cavity that includes a first end aperture and a second end aperture;
      a plunger having a plunger tip at one end, wherein the plunger is slidably position through the first end aperture of the barrel so that the plunger tip moves between a retracted position and an extended position;
      a pusher positioned in the cavity and having a tip extending outside of the second end aperture, wherein the pusher exerts force on the plunger and moves the plunger between a plunger extended position, a free motion position and a plunger retract position;
      wherein the barrel includes a body that slides into a cap, where the plunger extends through the body and the pusher slides within the cap;
      wherein the pusher has a first cam surface facing toward the plunger;
      one or more stops positioned radially within the cavity; and
      a rotating cam position between the second end of the plunger and the pusher, wherein the rotating cam has a plunger face surface in contact with the second end of the plunger and a second cam surface in contact with the first cam surface on the pusher, the rotating cam rotates about an axis of the barrel in response to the first cam surface of the pusher acting on the second cam surface of the rotating cam, such that the rotating cam rotates between a stop position wherein the second cam surface engages the one or more stops formed in the cavity of the barrel where the cap is located and holds the plunger in the extended position and a retracted position where the rotating cam slides past the one or more stops allowing the plunger to move the retracted position, and
   an actuator having a mover engageable with the tip of the pusher for providing force to the linear actuation mechanism thereby causing the at least one moveable vane to rotate between an open position and a closed position.

5. An active grille system having a linear actuation mechanism comprising:

an active grille system having at least one moveable vane connected to a frame, wherein the at least one moveable vane rotates between an open position and a closed position;

a linear actuation mechanism connectable to the at least one moveable vane, wherein the linear actuation mechanism includes:

a barrel with a cavity that includes a first end aperture and a second end aperture, wherein the barrel includes a body that slides into a cap;

a plunger having a plunger tip at one end, wherein the plunger is slidably position through the first end aperture of the barrel so that the plunger tip moves between a retracted position and an extended position and a pusher is positioned in the cavity and has a tip extending outside of the second end aperture, wherein the pusher exerts force on the plunger and moves the plunger between a plunger extended position, a free motion position and a plunger retract position;

the pusher has a first cam surface facing toward the plunger;

one or more stops positioned radially within the cavity; and a rotating cam position between the second end of the plunger and the pusher, wherein the rotating cam has a plunger face surface in contact with the second end of the plunger and a second cam surface in contact with the first cam surface on the pusher, the rotating cam rotates about an axis of the barrel in response to the first cam surface of the pusher acting on the second cam surface of the rotating cam, such that the rotating cam rotates between a stop position wherein the second cam surface engages the one or more stops and holds the plunger in the extended position and a retracted position where the rotating cam slides past the one or more stops allowing the plunger to move the retracted position, and an actuator having a mover engageable with the tip of the pusher for providing force to the linear actuation mechanism thereby causing the at least one moveable vane to rotate between an open position and a closed position.

6. The active grille system having a linear actuation mechanism of claim 5, wherein the linear actuation mechanism further comprises:

a shaft of the plunger; and a retraction spring circumscribing a portion of the shaft of the plunger positioned between a wall adjacent the first end aperture of the barrel and a spring bushing formed on the plunger, wherein the retraction spring biases the plunger tip toward the retracted position.

7. The active grille system having a linear actuation mechanism of claim 5, wherein the actuator is a solenoid actuator and the mover presses on the tip of the pusher.

8. An active grille system having a linear actuation mechanism comprising:

an active grille system having at least one moveable vane connected to a link arm, wherein the at least one moveable vane rotates between an open position and a closed position using force transmitted by the link arm;

an actuator having a mover for providing force to a linear actuation mechanism that is connected to the link arm;

a barrel with a cavity having an axis, the barrel includes a first end aperture and a second end aperture;

a plunger having a plunger tip at one end and a cam connection at a second end, wherein the plunger is slidably position through the first end aperture of the barrel so that the plunger tip moves between a retracted position and an extended position;

a retraction spring circumscribing a portion of the shaft of the plunger positioned between a wall adjacent the first end aperture of the barrel and a spring bushing on an outside surface of the plunger, wherein the retraction spring biases the plunger tip toward the retracted position;

a pusher positioned in the cavity and having a tip extending outside of the second end aperture, the tip being engageable with the actuator, wherein the pusher moves between a plunger extended position, a free motion position and a plunger retract position, the pusher has a first cam surface facing toward the plunger;

one or more stops positioned radially within the cavity; and a rotating cam position between the second end of the plunger and the pusher, wherein the rotating cam has a plunger face surface in contact with the second end of the plunger and a second cam surface in contact with the first cam surface on the pusher, the rotating cam rotates about the axis in response to the first cam surface of the pusher acting on the second cam surface of the rotating cam, such that the rotating cam rotates between a stop position wherein the second cam surface engages the one or more stops and holds the plunger in the extended position and a retracted position where the rotating cam slides past the one or more stops allowing the plunger to move the retracted position.

9. The active grille system having a linear actuation mechanism of claim 8, wherein the barrel includes a body that slides into a cap, where the plunger extends through the body and the pusher slides within the cap.

10. The active grille system having a linear actuation mechanism of claim 8, wherein the actuator is a solenoid actuator and the mover presses on the tip of the pusher.

* * * * *